Nov. 4, 1924.
S. W. SPARROW
1,513,870
METHOD AND DEVICE TO USE MULTIPLIED PRESSURES FOR
AUTOMATIC ALTITUDE ADJUSTMENTS FOR AIRCRAFT
Filed July 25, 1923
2 Sheets-Sheet 1
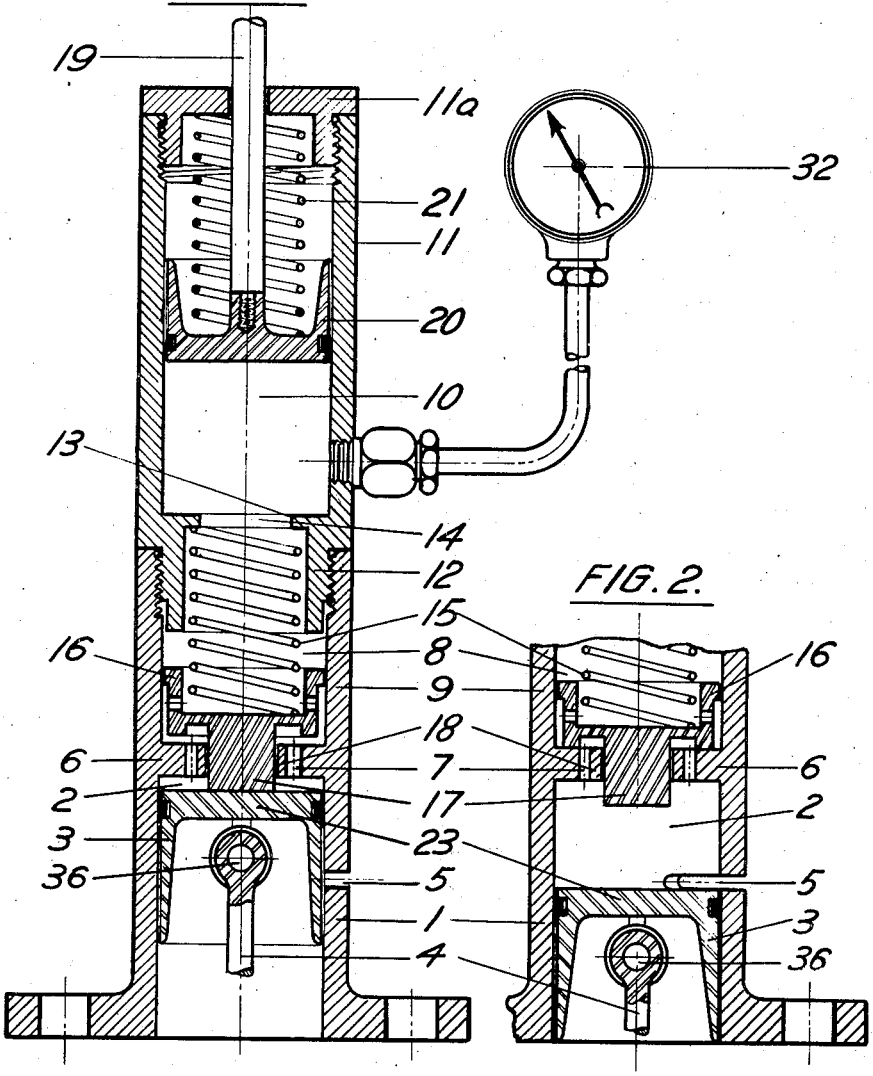

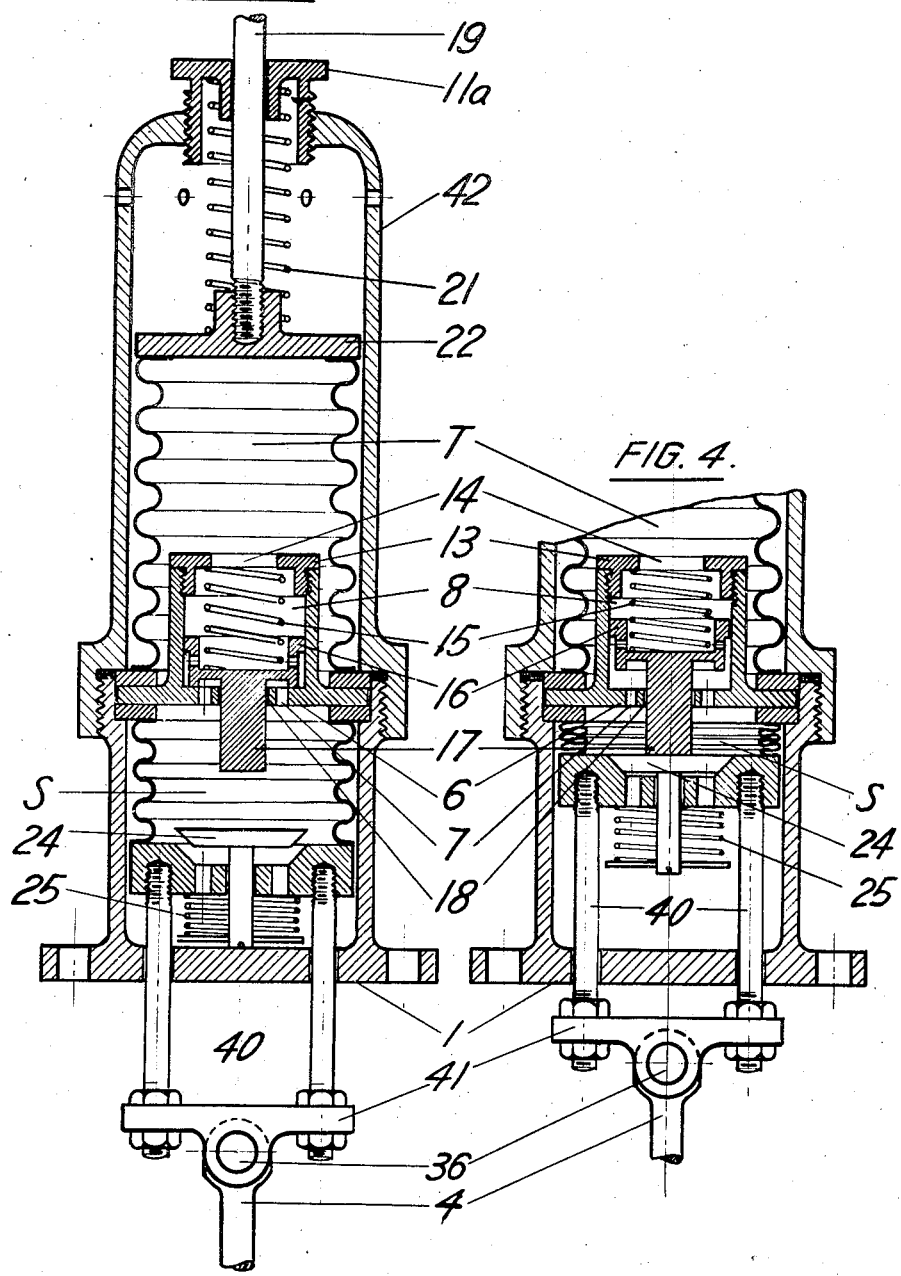

Patented Nov. 4, 1924.

1,513,870

UNITED STATES PATENT OFFICE.

STANWOOD W. SPARROW, OF MIDDLEBORO, MASSACHUSETTS.

METHOD AND DEVICE TO USE MULTIPLIED PRESSURES FOR AUTOMATIC ALTITUDE ADJUSTMENTS FOR AIRCRAFT.

Application filed July 25, 1923. Serial No. 653,826.

(FILED UNDER THE ACT OF MARCH 3, 1883, 22 STAT. L., 625.)

*To all whom it may concern:*

Be it known that I, STANWOOD W. SPARROW, a citizen of the United States, and resident of Middleboro, county of Plymouth, State of Massachusetts, have invented a new and useful Method and Device to Use Multiplied Pressures for Automatic Altitude Adjustments for Aircraft, of which the following is a specification.

This invention may be used by the Government or by any of its officers or employees, or by any other person in the United States, in the prosecution of work for the Government without payment of any royalty thereon.

This invention is a method and apparatus to use pressures which are a constant multiple of varying atmospheric pressures for automatic altitude adjustments designed more particularly for use on aircraft, although it is obvious that it is applicable to other uses.

The efficient performance of an aircraft requires that certain adjustments be made as the pressure of the air through which the aircraft passes becomes changed. Hence, there is the "altitude control" of the carburetor which enables the pilot to maintain the desired air-fuel ratio. Recent developments have increased both the number and importance of such adjustments. For example, the safety of the over-dimensioned engine depends upon the careful manipulation of spark advance and throttle opening and a proper control of a variable pitch propeller is necessary if the maximum performance of a supercharged engine is to be obtained.

Prior to this invention some schemes existed for automatic compensation. Nearly all of these automatic controls are essentially the same in principle. Their chief element is a tight chamber containing a gas (usually air). When the atmospheric pressure changes, the resultant change in the difference between it and the pressure of the gas within the chamber causes motion of some wall of the chamber. This motion effects the desired adjustment.

In such devices a leak in the supposedly tight chamber means utter failure. The elimination of this source of danger is one of the aims of the method of altitude compensation herein described. To this end the most important step is a change in the method of operating the automatic device. The change suggested is to make the source of operation the difference between atmospheric pressure and some multiple of atmospheric pressure greater than 1 instead of the difference between atmospheric pressure and that of a gas confined in a tight chamber. Tabulated values of the differences between atmospheric pressure and twice and ten times atmospheric pressure respectively may be stated as follows:

| Approximate altitude (feet). | Barometric pressure (Cm. Hg.). | (2-1) Atmospheric pressure (lb./sq. in.). | (10-1) Atmospheric pressure (lb./sq. in.). |
|---|---|---|---|
| Sea level | 76 | 14.7 | 132 |
| 5,000 | 63 | 12.2 | 110 |
| 10,000 | 52 | 10.1 | 91 |
| 15,000 | 44 | 8.5 | 77 |
| 20,000 | 36 | 7.0 | 63 |
| 25,000 | 30 | 5.8 | 52 |

Using 2 as the multiple gives a force for operating the adjustment equal to that which would be obtained in the conventional device if the sealed chamber were completely evacuated. With the higher multiples sufficient pressure is obtained to make it unnecessary either to provide a relay or to make the unit of large dimensions to care for adjustments whose operation requires considerable force.

A practical device based on the herein described method of altitude compensation is shown in the accompanying drawing, but it is to be understood that the device there shown is for the purpose of illustration only of one type of practical embodiment and not as defining the limits of the invention.

In the drawings—

Figure 1 is a vertical, sectional view through a pump and its reservoir with its movable wall to effect changes in adjustment;

Figure 2 is a fragmentary view of the device of Figure 1, showing the piston and control valve in their lower positions;

Figure 3 is a similar view, disclosing a so-called "sylphon" or metal bellows type of pump, together with a similar "sylphon" to effect the changes in adjustment;

Figure 4 is a fragmentary view of the embodiment of Figure 3, showing the piston and control valve in the raised or charging positions.

In the device illustrated in the drawings, the multiplication of pressure is obtained with a pump comparable in size to those now used for supplying pressure to fuel systems. For a pump of this type the following relation is true:

$$P_2 = P_1 \left(\frac{V_1}{V_2}\right) n$$

where $P_1$ = absolute pressure at beginning of compression stroke, $V_1$ = volume at beginning of compression stroke, $P_2$ = absolute pressure at end of compression stroke, $n$ = exponent having a value between 1.3 and 1.4, $V_2$ = volume at end of compression stroke, $V_1$, $V_2$ and $n$ are constant for any given pump and hence the quantity $$\left(\frac{V_1}{V_2}\right) n$$

is also constant. This relation can be chosen to give any multiple of the initial pressure that is desired. Since, with adequate port opening, $P_1$ is very nearly atmospheric pressure it is evident that the compression pressure of a pump of this sort is a constant multiple of the pressure of the air which surrounds it. This is the condition sought.

Referring more particularly to Figures 1 and 2 of the drawings, there is shown a base 1 having a piston chamber 2 within which is mounted a piston 3 having the usual connecting rod 4 connected to the piston by means of piston pin 36. Leading to the piston chamber 2 is shown a port 5 to permit air to enter the chamber 2. An end wall 6 may be provided with ports 7 leading from the chamber 2 to an intermediate chamber 8 formed by a wall 9. Mounted on this wall 9 by any suitable means is an element forming a third chamber 10 surrounded by the wall 11, which wall may have a depending section 12 to protrude into the intermediate chamber 8. Chambers 8 and 10 together constitute and function as a single reservoir, being made separately in this instance solely for convenience in construction. The third member may have a shoulder 13, shown in the drawings as an annular shoulder, surrounding a passage 14 leading from chamber 8 to the third chamber 10. This shoulder 13 serves as an abutment for a spring 15 mounted within the chamber 8. A check valve 16 is shown positioned for movement within chamber 8 and is normally maintained in a position to close the ports 7 by the spring 15, which is seated in the valve 16. This valve may be provided with a depending boss 17 designed to pass through an aperture 18, the purpose of which will be hereinafter described.

Suitably secured to the wall 11 of the third member is an end wall 11[a] to form one end of the reservoir consisting of chambers 8 and 10. The end wall 11[a] may be provided with a central opening through which passes a control rod 19, shown secured at one end to a movable element, such as the wall 20, mounted within the chamber 10. This control rod 19 may be connected to adjust the carburetor control (not shown) or the spark advance device (not shown) or the propeller adjustments (not shown). If desired, the movement of the wall 20 may be resisted or limited in one direction by a resilient element, shown in the drawings as a spring 21, positioned between the movable wall 20 and the end wall 11[a]. It is understood that in practice the piston 3, the movable element or wall 20 and various jointed sections may be provided with suitable packing to prevent leakage of the air or gas under compression.

The reservoir section 11 may be provided also with a gauge 32 leading to the reservoir 10 to disclose the pressures within the reservoir.

An alternative method of construction is shown in Figure 3. In lieu of the piston of Figure 1 a so-called "sylphon" S is used as a pumping means. In this construction air is admitted through poppet valve 24 closed by a spring 25 except during that portion of the cycle when the valve stem abuts against base 1. In lieu of chamber 10 in Figure 1 another sylphon T may be used. This sylphon is provided with a movable portion or wall 22 with which may be connected the control rod 19.

When the piston is in its lowest position, as in Fig. 2, air or gas enters the cylinder through port 5. On its upward stroke the piston 3 first closes this port and then compresses the air above it in chamber 2. This air, as soon as its pressure is sufficiently high, opens check valve 16 and passes through port 7 and thence around the valve 16 into reservoir chambers 8 and 10. The process continues until the pressure in the reservoir is approximately the same as that in the chamber 2 at the end of the compression stroke of the piston 3. From then on, the piston 3 merely compresses and re-expands the same charge and its operation requires an amount of power only slightly in excess of that necessary to overcome the piston friction. If the valve 16 was constructed without the depending boss 17, the device would function satisfactorily only when the aircraft was descending; that is to say, when the compression pressure was increasing. With the compression pressure decreasing, as in passing from a lower to a higher altitude, check valve 16 would fail to open and the pressure in reservoir chambers 8 and 10 would cease to be a constant multiple of the pressure of the surrounding atmosphere. The remedy is to open positively a passage between the pump of piston chamber 2 and reservoir chambers 8 and 10 for a short time during each cycle. This permits an equalization of reservoir and cylinder pressures regardless of whether the atmospheric pressure is increasing or decreasing. To secure this positive opening check valve 16 is provided with the boss 17, previously referred to, which comes in contact with the head 23 of the piston and causes the valve 16 to be lifted from its seat for a short distance; for example, about 1/32nd of an inch at each revolution. When the pressure in reservoir chambers 8 and 10 changes, the wall 20 of Figure 1, or a similar element 20 of Fig. 2, moves until the pressure of the spring 21 on one side balances the difference in pressure between the air or gas inside the reservoir 10 and that outside of the reservoir. It is to be understood that the same principle applies to the embodiment shown in Figures 3 and 4 in addition to which the sylphon S has the poppet valve 24, which may be opened when its shank or boss engages the base 1. It is the movement of the elements 20 or 22 which causes a movement of the control rod 19 attached to the desired instrumentalities of the aircraft equipment and which actually effects the desired adjustment. By means of the pressure gauge 32, the pilot of the aircraft can determine whether or not the device is functioning properly. The piston may, if desired, be driven direct from the aircraft engine or by any other suitable means.

It is obvious that it is possible to operate several devices of control mechanisms of the aircraft from a single pump installation. This would require merely that each individual reservoir should have a movable element such as a wall 20, and that each wall should be connected by a pipe with the main reservoir 10. Such multiple control mechanism is not herein illustrated as it is believed it will be readily understood by those skilled in the art.

Having thus described my invention, what I claim as new is:—

1. In a device of the class described, a reservoir having a movable element, means to pump air into the reservoir to cause the pressure of the air in the reservoir to become a constant multiple of the surrounding atmospheric pressure, and a valve interposed between the pumping means and the reservoir, said valve having means adapted to be opened positively for a portion of each cycle to permit an equalization of reservoir and pump pressure.

2. In a device of the class described, a reservoir having a movable element, means to pump air into the reservoir to cause the pressure of the air within the reservoir to become a constant multiple of the surrounding atmospheric pressure, a valve interposed between the pumping means and reservoir and having means to maintain the valve in a closed position, said valve having a boss adapted to be engaged by the pumping means to lift the valve from its seat at the compression stroke of the pumping means to thereby equalize the pressure within the reservoir with the pumping compression multiple of the pressure of the surrounding atmosphere, and means carried by said movable element to indicate changes of pressure.

3. In a device of the class described, a reservoir having a movable element provided with a resilient member to cause said movable element to balance the differences in pressure between the air within the reservoir and the surrounding atmospheric air, means to pump air into the reservoir, a valve interposed between the pumping means and the reservoir, and means whereby the pumping means or the pressure of the compressed gas may open the valve to equalize the pressure within the reservoir with the multiple of atmospheric pressure produced by the pumping means.

4. In a device of the class described, a reservoir having a movable element provided with a resilient element to cause said movable element to balance the differences in pressure between the air within the reservoir and the surrounding atmospheric air, means to pump air into the reservoir, a valve interposed between the pumping means and the reservoir, means whereby the pumping means may open the valve on the compression action of the pumping means to equalize the pressure within the reservoir with the multiple of the pressure of the surrounding atmosphere produced by the pumping means, and means connecting the movable element of the reservoir with an instrumentality to be affected.

5. In a device of the class described, a casing within which is mounted an expansible reservoir having a plurality of rigid end walls, one of which is movable as the reservoir expands, a check-valve in one of said walls, a check-valve positioned intermediate the rigid walls and within the reservoir, means to admit air into the reservoir and release it therefrom to cause the pressure of the air in the reservoir to become a constant multiple of the surrounding atmospheric pressure, and means to connect the movable end wall of the reservoir to an instrumentality to be actuated.

6. The method of using multiplied pressures for altitude adjustments for aircraft which comprises the storage of air at nearly atmospheric pressure within the reservoir having a movable wall to which adjusting devices are connected, thereafter introducing air into the reservoir or withdrawing air from the reservoir until the compression pressure of the air is a constant multiple of the surrounding atmospheric pressure whereby the movement of the movable wall due to the difference between the pressure within the reservoir and the surrounding atmospheric pressure will effect the desired adjustments of aircraft mechanisms.

7. The method of adjusting an element which controls the driving mechanism of aircraft to altitude which comprises the storage of a gas within a reservoir at a pressure which is a multiple of the atmospheric pressure where the storage is effected, and thereafter introducing gas into the reservoir or withdrawing gas therefrom in accordance with variations in atmospheric pressure as may be needed to make the pressure in the reservoir the same multiple of atmospheric pressure.

8. The method of adjusting an element which controls the driving mechanism of aircraft to altitude which comprises the storage of a gas within a reservoir which is in communication with a pressure indicator at a pressure which is a multiple of atmospheric pressure where the storage is effected, and thereafter introducing gas into the reservoir or withdrawing gas therefrom through control means which permits gas to enter the reservoir or escape therefrom in accordance with variations in atmospheric pressure as may be needed to make the pressure in the reservoir the same multiple of atmospheric pressure, until the indicator shows that such pressure in the reservoir has been attained.

STANWOOD W. SPARROW.